(12) United States Patent
Cheng et al.

(10) Patent No.: US 6,619,949 B1
(45) Date of Patent: Sep. 16, 2003

(54) ENERGY-SAVING HEAT EXCHANGER

(75) Inventors: Po-Jen Cheng, Taipei (TW); Wen-Jui Wen, Hsinchu (TW); Yu-Sheng Ho, Hsin-Chu (TW); Yi-Lang Ku, Miao-Li Hsien (TW); Yang-Jinn Tsai, Hsin-Chu (TW); Renn-Yuan Chen, Yungkang (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 0 days.

(21) Appl. No.: 10/170,727

(22) Filed: Jun. 13, 2002

(51) Int. Cl.[7] ............................. F23D 11/44; F23L 15/00
(52) U.S. Cl. ............................. 431/11; 431/12; 431/207
(58) Field of Search ......................... 431/11, 36, 12, 431/207, 215, 62, 115, 116, 245; 137/6; 165/901; 110/302

(56) References Cited

U.S. PATENT DOCUMENTS

| 2,224,544 A | * | 12/1940 | Keller | .................. 126/109 |
|---|---|---|---|---|
| 2,795,054 A | * | 6/1957 | Bowen, III | .................. 34/514 |
| 3,604,824 A | * | 9/1971 | Hardison | .................. 431/116 |

* cited by examiner

Primary Examiner—Alfred Basichas
(74) Attorney, Agent, or Firm—Tung & Associates

(57) ABSTRACT

An energy-saving heat exchanger for a VOC abatement system. The energy-saving heat exchanger includes a fresh air chamber for receiving fresh air from a blower; a heated air chamber for receiving heated air from a secondary heat exchanger of the VOC abatement system; a mixed air chamber provided at the outlet ends of the fresh air chamber and heated air chamber; and a heat exchange chamber leading from the heated air chamber and disposed in thermally-conductive contact with the fresh air chamber. An oxygen detector measures the oxygen composition of air flowing from the mixed air chamber and operates a damper which controls flow of air from the heated air chamber to the mixing chamber.

20 Claims, 2 Drawing Sheets

ENERGY-SAVING HEAT EXCHANGER

FIELD OF THE INVENTION

The present invention relates to systems for eliminating volatile organic compounds (VOCs) used in various manufacturing processes. More particularly, the present invention relates to an energy-saving heat exchanger for saving fuel in such a system.

Industrial operations generate enormous quantities of hazardous air pollutants into the atmosphere around the world each year. These hazardous air pollutants include volatile organic compounds (VOCs) that are subject to emission control by various legislative bodies. VOCs have caused considerable environmental and health concerns in recent years due to their environment-polluting effects. For example, VOCs are precursors of ground-level ozone, which contributes to smog formation. Consequently, various manufacturing industries such as dry cleaners, bakeries, restaurants and microbreweries are being increasingly regulated with regard to effective and environment-preserving disposal of VOCs.

In the semiconductor production industry, various processing steps are used to fabricate integrated circuits on a semiconductor wafer. These steps include the deposition of layers of different materials including metallization layers, passivation layers and insulation layers on the wafer substrate, as well as photoresist stripping and sidewall passivation polymer layer removal. In modern memory devices, for example, multiple layers of metal conductors are required for providing a multi-layer metal interconnection structure in defining a circuit on the wafer. Chemical vapor deposition (CVD) processes are widely used to form layers of materials on a semiconductor wafer, while etching processes are used to etch a circuit pattern in a conductive layer after deposition of a masking layer on the conductive layer. Both CVD processes and etching processes generate VOCs which must be abated and vented from the semiconductor fab in an environmentally satisfactory manner.

One example of a conventional VOC abatement system utilized in the semiconductor fabrication industry for the treatment and elimination of VOCs is generally indicated by reference numeral 10 in FIG. 1. The system 10 includes a fresh air blower 12 which blows fresh air into a combustion chamber 14. A primary ignition fuel such as diesel oil is ignited in the combustion chamber 14 to heat the fresh air therein. The heated air is directed through an air intake line 18 to a primary heat exchanger 16, where process. gases including VOCs distributed from a VOC concentrator 28 through a gas service line 38 and the primary heat exchanger 16 are heated by thermal exchange with the heated air flowing through the primary heat exchanger 16. The heated process gases are distributed from the primary heat exchanger 16 through a gas entry line 40 and into the combustion chamber 14, where the process gases are used as a secondary ignition fuel in the combustion chamber 14 to heat the air from the fresh air blower 12.

The heated air flows from the primary heat exchanger 16 through an air transfer line 20 to a secondary heat exchanger 22, where heat is transferred from the heated air to process gases flowing from a process gas entry line 26 and a bypass line 34, respectively. The heated process gas flows from the secondary heat exchanger 22 and into the VOC concentrator 28 through a VOC entry line 36. Some of the heated process gas in the VOC concentrator 28 flows to the primary heat exchanger 16 and ultimately, to the combustion chamber 14 through the gas service line 38 and gas entry line 40, respectively. The rest of the heated process gas flows from the VOC concentrator 28 through a process gas outlet line 30 and finally, into a vent stack 44 through a vent stack entry line 42. The heated air from the secondary heat exchanger 22 flows into the vent stack entry line 42 through an air outlet line 24 and mixes with the process gas from the VOC concentrator 28 in the vent stack 44. The air and process gases are then vented from the vent stack 44.

In the conventional VOC abatement system 10, fresh air introduced into the combustion chamber 14 from the fresh air blower 12 has a temperature of typically about 25° C., or room temperature. It has been found that heating the fresh air to a temperature of about 120° C. or greater before introducing the air into the combustion chamber 14 substantially reduces the quantity of primary fuel required for heating the air in the combustion chamber 14.

Accordingly, an object of the present invention is to provide a device for saving fuel in a VOC abatement system.

Another object of the present invention is to provide a device for preheating fresh air before entry of the air into a combustion chamber in order to reduce the quantity of fuel required to heat the air.

Still another object of the present invention is to provide an energy-saving heat exchanger which is capable of efficiently heating air in order to reduce consumption of fuel used to heat the air in a VOC abatement system.

A still further object of the present invention is to provide an energy-saving heat exchanger which is capable of one of two modes of operation in the preheating of air introduced into a combustion chamber of a VOC abatement system.

Yet another object of the present invention is to provide an energy-saving heat exchanger which utilizes heated exhaust air to heat fresh air before entry of the fresh air into a combustion chamber of a VOC abatement system.

A still further object of the present invention is to provide an energy-saving heat exchanger which in a first mode of operation utilizes heated exhaust air to preheat fresh air before introducing the fresh air into a combustion chamber and which heat exchanger in a second mode of operation mixes the heated air with the fresh air and introduces the air mixture into a combustion chamber in the event that the fresh air has a minimum oxygen content.

SUMMARY OF THE INVENTION

In accordance with these and other objects and advantages, the present invention comprises an energy-saving heat exchanger for a VOC abatement system. The energy-saving heat exchanger includes a fresh air chamber for receiving fresh air from a blower; a heated air chamber for receiving heated air from a secondary heat exchanger of the VOC abatement system; a mixed air chamber provided at the outlet ends of the fresh air chamber and heated air chamber; and a heat exchange chamber leading from the heated air chamber and disposed in thermally-conductive contact with the fresh air chamber. An oxygen detector measures the oxygen composition of air flowing from the mixed air chamber and operates a damper which controls flow of air from the heated air chamber to the mixing chamber.

Normally, fresh air from the blower flows through the fresh air chamber and the mixed air chamber, respectively, and ultimately, into the combustion chamber of the VOC abatement system. When the oxygen composition in the fresh air flowing from the mixed air chamber is lower than a predetermined value, typically about 18%, the oxygen detector operates the actuator to completely close the damper and prevent flow of the oxygen-deficient heated air from the heated air chamber and into the mixed air chamber. Consequently, the heated air is averted from the heated air chamber and through the heat exchange chamber, wherein the fresh air flowing through the fresh air chamber is heated by the heated air flowing through the heat exchange chamber. Conversely, when the oxygen composition in the fresh air flowing from the mixed air chamber exceeds a predetermined oxygen concentration, such as about 18% oxygen concentration, the oxygen detector operates the actuator to open the damper and facilitate flow of heated air from the heated air chamber and into the mixed air chamber. This facilitates maximum heat exchange between the heated air and the fresh air as the mixed air flows from the mixed air chamber and is directed to the combustion chamber of the VOC abatement system. Consequently, the mixed air in the combustion chamber requires less fuel for heating than would otherwise be required for fresh air entering the combustion chamber at room temperature.

BRIEF DESCRIPTION OF THE DRAWINGS

The invention will now be described, by way of example, with reference to the accompanying drawings, wherein.

DESCRIPTION OF THE PREFERRED EMBODIMENTS

The present invention has particularly beneficial utility in preheating air for combustion in a combustion chamber of a VOC abatement system used in the abatement and venting of VOCs from a semiconductor fabrication facility. However, the invention is not so limited in application and while references may be made to such semiconductor fabrication facilities and VOC abatement systems, the invention is applicable to preheating air prior to combustion in a variety of industrial and mechanical applications.

Figure 3:
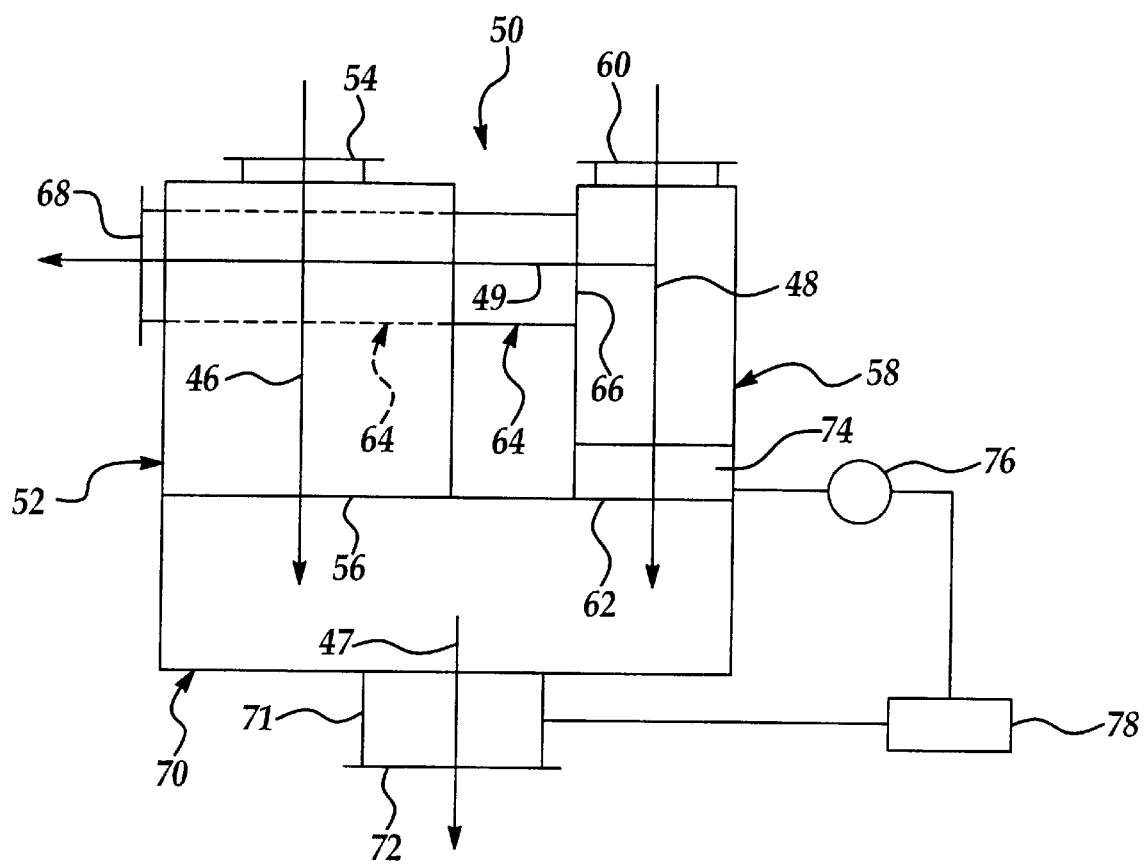
FIG. 3 is a top view of an energy-saving heat exchanger of the present invention.

An illustrative embodiment of the energy-saving heat exchanger of the present invention is generally indicated by reference numeral 50 in FIG. 3 and includes a fresh air chamber 52, having a fresh air intake end 54 and a fresh air outlet end 56 which is disposed in fluid communication with a mixed air chamber 70. A mixed chamber outlet arm 71 may extend from the mixed air chamber 70, in which case a mixed air outlet end 72 of the mixed air chamber 70 may be provided in the mixed chamber outlet arm 71.

The heat exchanger 50 further includes a heated air chamber 58, having a heated air intake end 60 and a heated air outlet end 62 which is disposed in fluid communication with the mixed air chamber 70. A heat exchange chamber 64 has a heat exchange intake end 66 disposed in fluid communication with the heated air chamber 58, between the heated air intake end 60 and the heated air outlet end 62 thereof. The heat exchange chamber 64 is disposed in thermally-conductive contact with the fresh air chamber 52 for the transfer of heat from heated air in the heat exchange chamber 64 to cooler fresh air in the fresh air chamber 52, as hereinafter described. The heat exchange chamber 64 includes a heat exchange outlet end 68 opposite the heat exchange intake end 66.

A damper 74 is provided in the heated air chamber 58, at the heated air outlet end 62 thereof for reversibly closing the heated air outlet end 62 as hereinafter further described. A damper actuator 76 is operably connected to the damper 74 for opening and closing the damper 74. An oxygen detector 78 is operably connected to the damper actuator 76 and contacts the interior of the mixed air chamber 70, typically in the mixed chamber outlet arm 71 thereof, and is operably connected to the oxygen detector 78.

Figure 1:
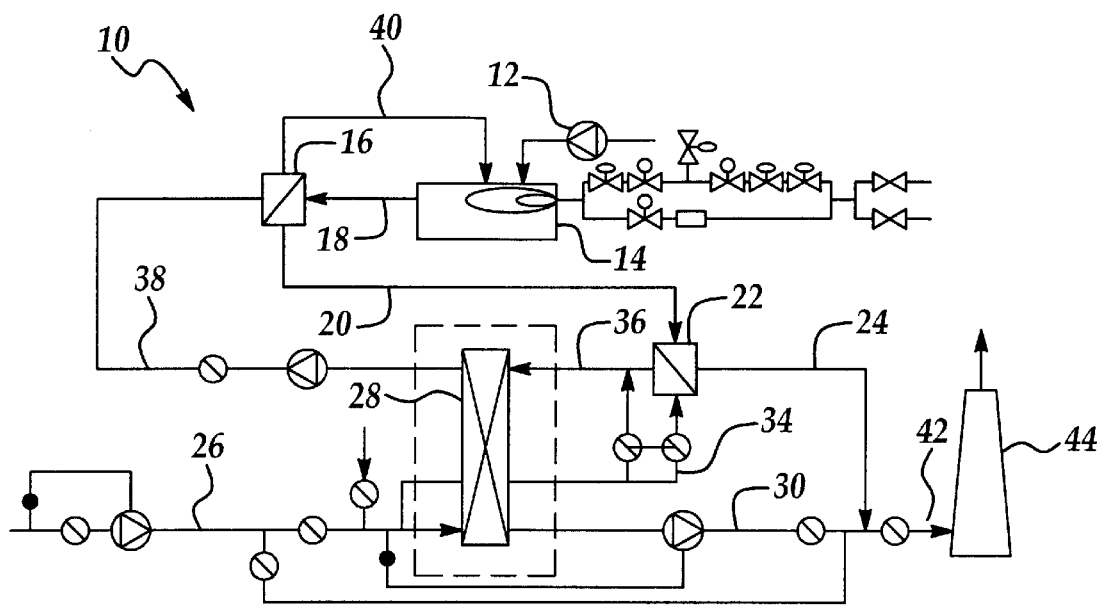
FIG. 1 is a schematic view illustrating a typical conventional VOC abatement system used for venting VOCs from a semiconductor fabrication facility.
Figure 2:
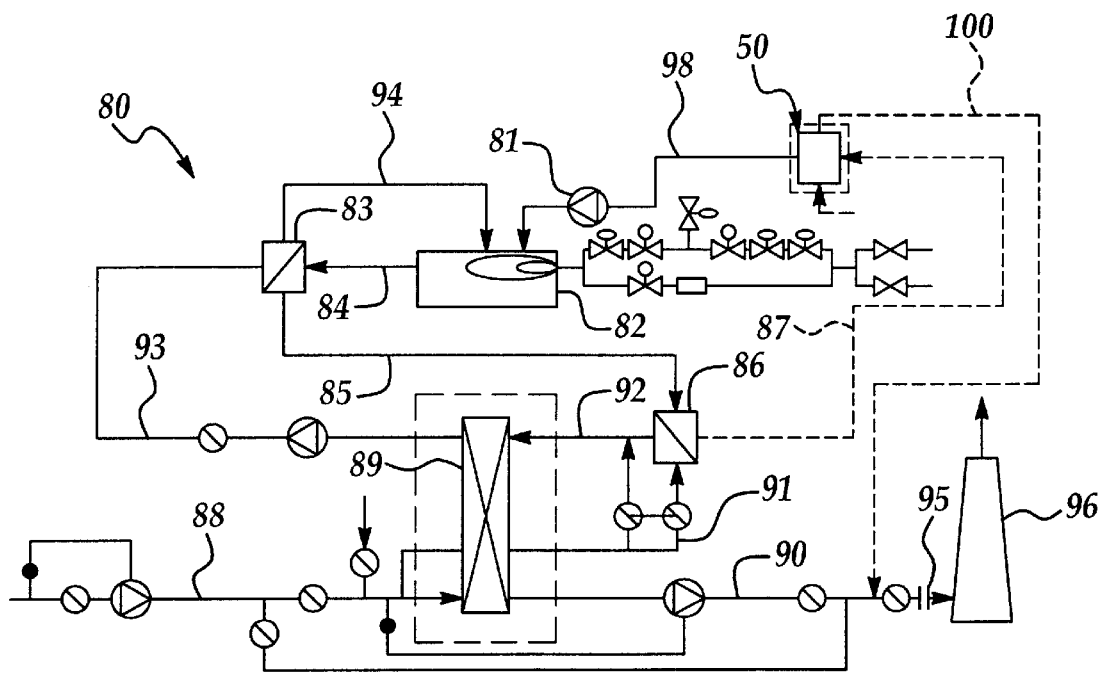
FIG. 2 is a schematic view illustrating a VOC abatement system in implementation of the present invention.

Referring next to FIG. 2, a VOC abatement system in implementation of the present invention is generally indicated by reference numeral 80. The VOC abatement system 80 hereinafter described may be used in the abatement and venting of VOCs from the various tools and equipment used in the processing of semiconductors in a semiconductor fabrication facility. However, the present invention may be used in VOC abatement systems of various design and description for the treatment and venting VOCs from any type of manufacturing or other facility.

The VOC abatement system 80 includes a fresh air blower 81, the intake end of which is provided in fluid communication with the mixed outlet end 72 (FIG. 3) of the mixed air chamber 70, typically through a mixed air outlet line 98. The outlet end of the fresh air blower 81 is provided in fluid communication with a combustion chamber 82. A primary ignition fuel such as diesel oil is ignited in the combustion chamber 82 to heat the air therein, typically in conventional fashion. An air intake line 84 connects the combustion chamber 82 to a primary heat exchanger 83, and an air transfer line 85 connects the primary heat exchanger 83 to a secondary heat exchanger 86. The secondary heat exchanger 86 is, in turn, connected in fluid communication with the heated air intake end 60 (FIG. 3) of the heated air chamber 58 in the heat exchanger 50, typically through a heated air outlet line 87. A waste air outlet line 100 leads from the heat exchange outlet end 68 of the heat exchange chamber 64 in the heat exchanger 50 and terminates in fluid communication with a vent stack entry line 95 that leads into a vent stack 96.

In typical application of the energy-saving heat exchanger 50 and VOC abatement system 80, the fresh air blower 81 is operated to continuously draw fresh air from the atmosphere, through the fresh air chamber 52 (FIG. 3) and mixed air chamber 70 of the heat exchanger 50, respectively, as indicated by the arrow 46, and through the mixed air outlet line 98 (FIG. 2) into the combustion chamber 82, respectively. A typical flow volume for fresh air flowing through the fresh air chamber 52 is about 200 cmh (cubic meters per hour). A primary ignition fuel such as diesel oil is ignited in the combustion chamber 82 to heat the fresh air therein. The heated air is directed through the air intake line 84 to the primary heat exchanger 83, where process gases including VOCs distributed from a VOC concentrator 89 through a gas service line 93 and the primary heat exchanger 83 are heated by thermal exchange with the heated air flowing through the primary heat exchanger 83. The heated process gases are distributed from the primary heat exchanger 83 through a gas entry line 94 and into the combustion chamber 82, where the process gases are used as a secondary ignition fuel to heat the air from the fresh air blower 81.

The heated air flows from the primary heat exchanger 83 through the air transfer line 85 to the secondary heat exchanger 86, where heat is transferred from the heated air to process gases flowing through the primary heat exchanger 83 from a process gas entry line 88 and a bypass line 91, respectively. The process gas entry line 88 receives process gases from the various processing tools and equipment (not illustrated) in the semiconductor fabrication facility. The heated process gas flows from the secondary heat exchanger 86 and into the VOC concentrator 89 through a VOC entry line 92. Some of the heated process gas in the VOC concentrator 89 flows through the gas service line 93 to the primary heat exchanger 83 and ultimately, to the combustion chamber 82 through the gas service line 93 and the gas entry line 94, respectively. The rest of the heated process gas flows from the VOC concentrator 89 through a process gas outlet line 90 and finally, into the vent stack 96 through the vent stack entry line 95.

The heated air from the secondary heat exchanger 86 flows through the heated air outlet line 87 and into the heated air intake end 60 (FIG. 3) of the heated air chamber 58 in the heat exchanger 50. A typical flow volume of the heated air flowing through the heated air chamber 58 is about 4000 cmh. Simultaneously, the fresh air blower 81 continues to draw fresh air from the atmosphere and through the fresh air chamber 52, as indicated by the arrow 46, and from the mixed air chamber 70, as indicated by the arrow 47, and into the combustion chamber 82. Due to the previous combustion in the combustion chamber 82, the heated air flowing into the heated air chamber 58 typically has a lower oxygen content than that of the fresh air flowing into the mixed air chamber 70 from the fresh air chamber 52. When the oxygen composition in the air flowing from the mixed air chamber 70 at the mixed air outlet end 72 is lower than a predetermined value, typically about 18% as sensed by the oxygen detector 78, the oxygen detector 78 operates the damper actuator 76 to close the damper 74 and prevent flow of the oxygen-deficient heated air from the heated air chamber 58 and into the mixed air chamber 70. Consequently, as indicated by the arrow 49, the heated air is averted from the heated air chamber 58 and through the heat exchange chamber 64, wherein the fresh air flowing through the adjacent fresh air chamber 52 is heated from a temperature of typically about 25° C. to about 120° C. by the heated air flowing through the heat exchange chamber 64. Conversely, when the oxygen content in the fresh air flowing from the mixed air chamber 70 exceeds a predetermined oxygen concentration, such as at least about 18% oxygen content, the oxygen detector 78 operates the damper actuator 76 to open the damper 74 and facilitate flow of the oxygen-deficient heated air from the heated air chamber 58 and into the mixed air chamber 70, as indicated by the arrow 48. The heated air from the heated air chamber 58 thus mixes with the fresh air from the fresh air chamber 52, and this facilitates maximum heat exchange between the heated air and the fresh air in the mixed air chamber 70. By continuous operation of the fresh air blower 81, the mixed air then flows from the mixed air chamber 70, as indicated by the arrow 47, through the mixed air outlet line 98 and into the combustion chamber 82 of the VOC abatement system 80. Because the mixed air flowing into the combustion chamber 82 has a substantially higher temperature (about 200° C.) than the temperature of fresh air (about 120° C.) which would otherwise flow into the combustion chamber 82 without the heated air mixed therein, the mixed air in the combustion chamber 82 requires less primary fuel for combustion. The oxygen detector 78 and damper 74 ensure that the mixed air entering the combustion chamber 82 contains a sufficiently high oxygen content for optimal combustion in the combustion chamber 82.

It will be appreciated by those skilled in the art that the energy saving heat exchanger of the present invention is capable of reducing the quantity of fuel required for heating air in the combustion chamber 82 by preheating the air introduced into the chamber 82 without the need for additional energy input into the VOC abatement system 10 for the purpose. Referring again to FIG. 3, in the event that the efficiency of the heat exchanger 50 is 70%, the efficiency of thermal transfer from the heated air in the heat exchange chamber 64 to the fresh air in the fresh air chamber 52, when the damper 74 is closed, is 5510 kcal/hr. When the damper 74 is opened, the efficiency of thermal transfer between the heated air and the fresh air in the mixing chamber 70 rises to 64,960 kcal/hr. In the event that the efficiency of the heat exchanger 50 is only 50%, the efficiency of thermal transfer between the heated air and the fresh air in the mixing chamber 70 is still substantial, at 46,400 kcal/hr.

While the preferred embodiments of the invention have been described above, it will be recognized and understood that various modifications can be made in the invention and the appended claims are intended to cover all such modifications which may fall within the spirit and scope of the invention.

Having described our invention with the particularity set forth above, we claim:

1. An energy-saving heat exchanger comprising:
   a fresh air chamber for receiving fresh air;
   a heated air chamber for receiving heated air;
   a mixed air chamber provided in fluid communication with said fresh air chamber and said heated air chamber for receiving and mixing said fresh air and said heated air; and
   a heat exchange chamber provided in fluid communication with said heated air chamber and in thermally-conductive contact with said fresh air chamber.

2. The heat exchanger of claim 1 further comprising a damper provided in said heated air chamber for reversibly blocking flow of the heated air from said heated air chamber to said mixed air chamber and a damper actuator operably connected to said damper for opening and closing said damper.

3. The heat exchanger of claim 1 further comprising a mixed chamber outlet arm provided on said mixed air chamber.

4. The heat exchanger of claim 3 further comprising a damper provided in said heated air chamber for reversibly blocking flow of the heated air from said heated air chamber to said mixed air chamber and an actuator operably connected to said damper for opening and closing said damper.

5. An energy-saving heat exchanger comprising:
   a fresh air chamber for receiving fresh air;
   a heated air chamber for receiving heated air;
   a mixed air chamber provided in fluid communication with said fresh air chamber and said heated air chamber for receiving and mixing said fresh air and said heated air;
   a heat exchange chamber provided in fluid communication with said heated air chamber and in thermally-conductive contact with said fresh air chamber;
   a damper provided in said heated air chamber for reversibly blocking flow of the heated air from said heated air chamber to said mixed air chamber and a damper actuator operably connected to said damper for opening and closing said damper; and
   an oxygen detector operably connected to said damper actuator for detecting oxygen content in said mixing chamber and operating said damper actuator to close said damper when said oxygen content is less than a predetermined percentage.

6. The heat exchanger of claim 5 further comprising a mixed chamber outlet arm provided on said mixed air chamber.

7. The heat exchanger of claim 5 wherein said predetermined percentage of said oxygen content is at least about 18%.

8. The heat exchanger of claim 7 further comprising a mixed chamber outlet arm provided on said mixed air chamber.

9. A VOC abatement system comprising:
a combustion chamber;
a heated air chamber for receiving heated air from said combustion chamber;
a fresh air chamber for receiving fresh air;
a mixed air chamber provided in fluid communication with said fresh air chamber and said heated air chamber for receiving and mixing said fresh air and said heated air;
a heat exchange chamber provided in fluid communication with said heated air chamber and in thermally-conductive contact with said fresh air chamber; and
a blower for distributing air from said mixed air chamber to said combustion chamber.

10. The system of claim 9 further comprising a damper provided in said heated air chamber for reversibly blocking flow of the heated air from said heated air chamber to said mixed air chamber and a damper actuator operably connected to said damper for opening and closing said damper.

11. The system of claim 9 further comprising at least one heat exchanger interposed between said combustion chamber and said heated air chamber.

12. The system of claim 11 further comprising a damper provided in said heated air chamber for reversibly blocking flow of the heated air from said heated air chamber to said mixed air chamber and a damper actuator operably connected to said damper for opening and closing said damper.

13. A VOC abatement system comprising:
a combustion chamber;
a heated air chamber for receiving heated air from said combustion chamber;
a fresh air chamber for receiving fresh air;
a mixed air chamber provided in fluid communication with said fresh air chamber and said heated air chamber for receiving and mixing said fresh air and said heated air;
a heat exchange chamber provided in fluid communication with said heated air chamber and in thermally-conductive contact with said fresh air chamber;
a blower for distributing air from said mixed air chamber to said combustion chamber;
a damper provided in said heated air chamber for reversibly blocking flow of the heated air from said heated air chamber to said mixed air chamber and a damper actuator operably connected to said damper for opening and closing said damper; and
an oxygen detector operably connected to said damper actuator for detecting oxygen content in said mixing chamber and operating said damper actuator to close said damper when said oxygen content is less than a predetermined percentage.

14. The system of claim 13 further comprising at least one heat exchanger interposed between said combustion chamber and said heated air chamber.

15. The system of claim 13 wherein said predetermined percentage of said oxygen content is at least about 18%.

16. The system of claim 15 further comprising at least one heat exchanger interposed between said combustion chamber and said heated air chamber.

17. A method of preheating air for combustion, comprising the steps of:
providing a combustion chamber;
providing a heated air chamber in fluid communication with said combustion chamber;
providing a fresh air chamber;
providing a mixed air chamber in fluid communication with said fresh air chamber, said heated air chamber and said combustion chamber;
providing a heat exchange chamber in fluid communication with said heated air chamber and in thermally-conductive contact with said fresh air chamber;
distributing fresh air through said fresh air chamber and said mixed air chamber to said combustion chamber; and
distributing heated air from said combustion chamber to said heated air chamber and said heat exchange chamber, whereby said fresh air in said fresh air chamber is heated by said heated air in said heat exchange chamber.

18. The method of claim 17 further comprising the steps of providing a damper in said heated air chamber and selectively preventing and facilitating flow of said heated air from said heated air chamber into said mixed air chamber by closing and opening, respectively, said damper.

19. A method of preheating air for combustion, comprising the steps of:
providing a combustion chamber;
providing a heated air chamber in fluid communication with said combustion chamber;
providing a fresh air chamber;
providing a mixed air chamber in fluid communication with said fresh air chamber, said heated air chamber and said combustion chamber;
providing a heat exchange chamber in fluid communication with said heated air chamber and in thermally-conductive contact with said fresh air chamber;
distributing fresh air through said fresh air chamber and said mixed air chamber to said combustion chamber;
distributing heated air from said combustion chamber to said heated air chamber and said heat exchange chamber, whereby said fresh air in said fresh air chamber is heated by said heated air in said heat exchange chamber;
providing a damper in said heated air chamber and selectively preventing and facilitating flow of said heated air from said heated air chamber into said mixed air chamber by closing and opening, respectively, said damper; and
operably connecting an oxygen detector to said damper and said mixing chamber, detecting an oxygen content in said mixing chamber and closing said damper when said oxygen content is less than a predetermined value.

20. The method of claim 19 wherein said predetermined value of said oxygen content is about 18%.

* * * * *